United States Patent
Pilpel et al.

(10) Patent No.: US 8,763,668 B2
(45) Date of Patent: Jul. 1, 2014

(54) APPARATUS FOR MAKING SHEETS OF COMPOSITE MATERIAL

(75) Inventors: Edward Pilpel, Avon, CT (US); Benjamin Pilpel, Montrose, CO (US)

(73) Assignee: Polystrand, Inc., Montrose, CO (US)

( * ) Notice: Subject to any disclaimer, the term of this patent is extended or adjusted under 35 U.S.C. 154(b) by 168 days.

(21) Appl. No.: 13/372,786

(22) Filed: Feb. 14, 2012

(65) Prior Publication Data

US 2012/0145327 A1    Jun. 14, 2012

Related U.S. Application Data

(63) Continuation of application No. 12/410,556, filed on Mar. 25, 2009, now Pat. No. 8,201,608.

(60) Provisional application No. 61/039,556, filed on Mar. 26, 2008.

(51) Int. Cl.
| | |
|---|---|
| B29C 65/00 | (2006.01) |
| F41H 5/04 | (2006.01) |
| B29C 65/50 | (2006.01) |
| B29C 70/50 | (2006.01) |
| B29K 105/06 | (2006.01) |
| B29C 70/20 | (2006.01) |
| B29L 31/00 | (2006.01) |
| B29K 101/12 | (2006.01) |

(52) U.S. Cl.
CPC .......... *B29C 66/1142* (2013.01); *B29K 2105/06* (2013.01); *B29C 66/435* (2013.01); *B29C 70/202* (2013.01); *F41H 5/0471* (2013.01); *B29C 65/5042* (2013.01); *B29L 2031/721* (2013.01); *B29C 66/721* (2013.01); *B29K 2101/12* (2013.01); *F41H 5/0485* (2013.01); *B29C 70/504* (2013.01)
USPC .......... 156/544; 156/304.6; 156/499; 156/555

(58) Field of Classification Search
CPC ..................................................... B29C 66/435
USPC .............. 156/177, 178, 179, 182, 265, 307.1, 156/308.2, 324.4, 324, 381, 499, 544, 545, 156/546, 554, 555, 304.1, 304.6, 568, 549
See application file for complete search history.

(56) References Cited

U.S. PATENT DOCUMENTS

| | | |
|---|---|---|
| 1,781,378 A | 11/1930 | Feeney |
| 3,546,056 A | 12/1970 | Thomas |

(Continued)

FOREIGN PATENT DOCUMENTS

| | | |
|---|---|---|
| CN | 1654191 A | 8/2005 |
| DE | 3118716 A1 | 12/1982 |

(Continued)

OTHER PUBLICATIONS

PCT International Search Report dated Jul. 16, 2009; (PCT/US2009/038173).

(Continued)

*Primary Examiner* — John Goff
(74) *Attorney, Agent, or Firm* — MKG, LLC

(57) ABSTRACT

A product sheet of composite material can be made by disposing composite materials of composite material in adjacent (side-by-side) relation with each other. The composite materials comprise fibers in a thermoplastic matrix material. The adjacent composite materials are bonded together to provide a product sheet of composite material. Preferably, a cross ply of composite material is disposed on the composite materials. The cross ply may be a unidirectional sheet and the fibers in the cross ply may be disposed in transverse relation to the fibers in the composite materials.

20 Claims, 12 Drawing Sheets

(56) References Cited

U.S. PATENT DOCUMENTS

| | | | |
|---|---|---|---|
| 3,553,064 A | | 1/1971 | Wideman |
| 3,682,734 A | | 8/1972 | Burger |
| 3,767,510 A | * | 10/1973 | Gustafson ................. 156/494 |
| 4,698,109 A | | 10/1987 | Lazar |
| 4,931,126 A | | 6/1990 | McCarville et al. |
| 5,173,138 A | | 12/1992 | Blauch et al. |
| 5,232,533 A | | 8/1993 | Tani et al. |
| 5,695,579 A | | 12/1997 | Rowland |
| 5,885,410 A | | 3/1999 | Berkan |
| 6,294,036 B1 | * | 9/2001 | Loubinoux et al. ........... 156/181 |
| 2004/0082244 A1 | * | 4/2004 | Loubinoux ................... 442/181 |
| 2004/0154734 A1 | | 8/2004 | Akada et al. |
| 2005/0173063 A1 | | 8/2005 | Hiramoto |
| 2006/0118238 A1 | | 6/2006 | Borazghi |
| 2006/0151094 A1 | | 7/2006 | Angelini et al. |
| 2006/0228963 A1 | * | 10/2006 | Souther et al. ................ 442/86 |

FOREIGN PATENT DOCUMENTS

| | | |
|---|---|---|
| FR | 1360107 | 4/1964 |
| JP | 51-123288 A | 10/1976 |
| JP | 60-226581 A | 11/1985 |
| JP | 62-179932 A | 8/1987 |
| JP | 08-507982 A | 8/1996 |
| JP | 2004-0216879 A | 8/2004 |

OTHER PUBLICATIONS

Office Action from Chinese Application No. 200980110730.4, dated Dec. 5, 2012.

Office Action from Japanese Application No. 2011-502002 dated Oct. 30, 2012.

* cited by examiner

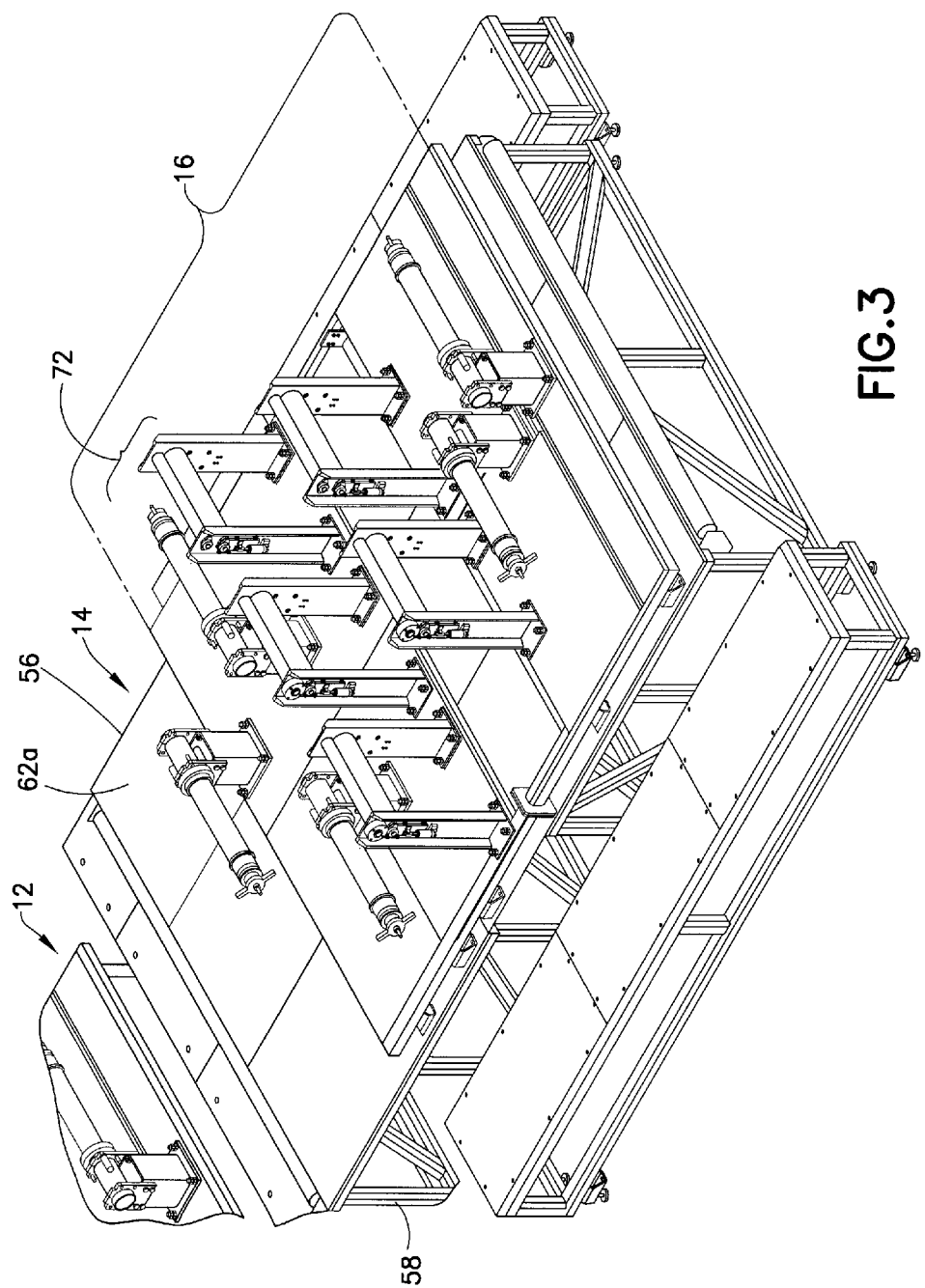

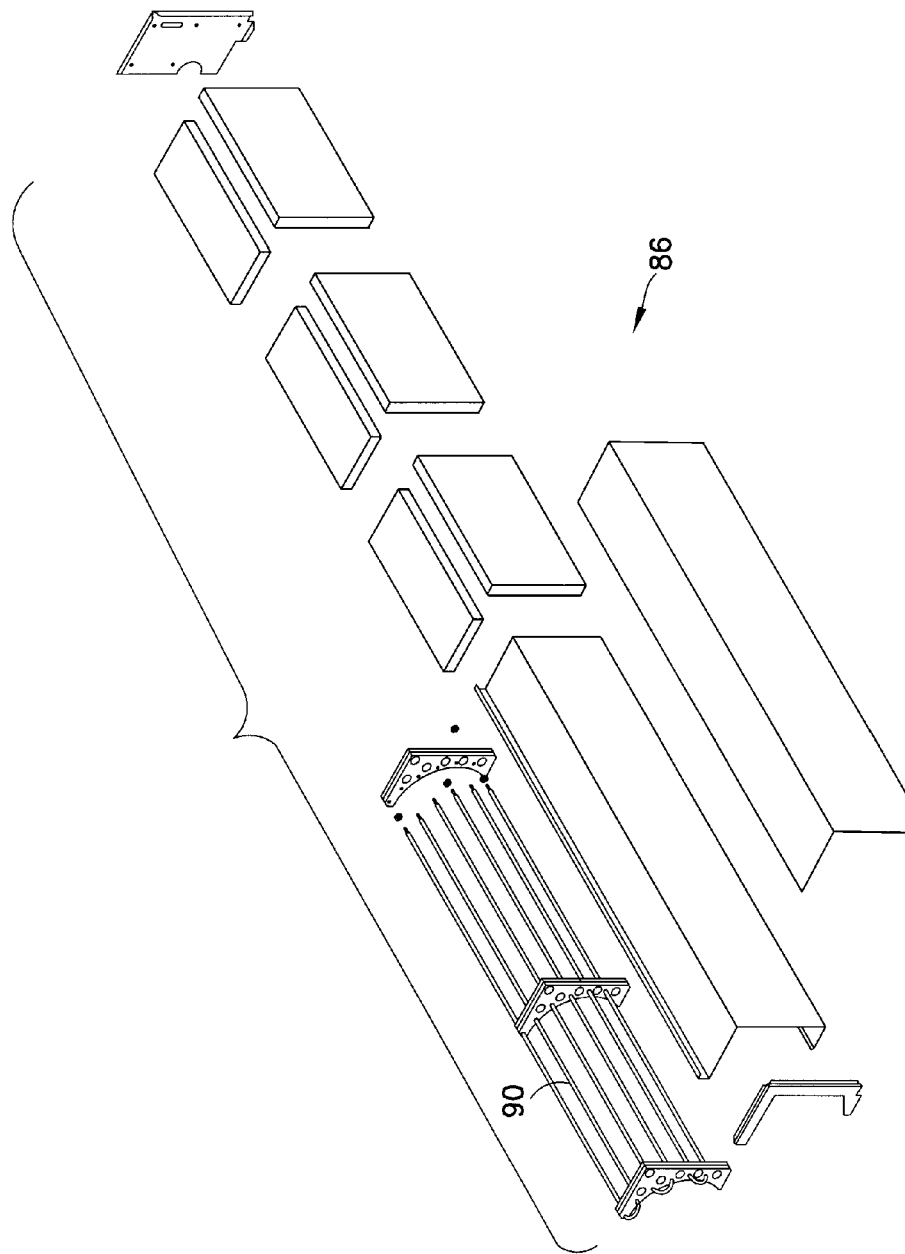

APPARATUS FOR MAKING SHEETS OF COMPOSITE MATERIAL

CROSS-REFERENCE TO RELATED APPLICATION

This application is a continuation of and claims the benefit of U.S. non-provisional application Ser. No. 12/410,556, filed Mar. 25, 2009 now U.S. Pat. No. 8,201,608, which claims the benefit of U.S. provisional application No. 61/039,556, filed Mar. 26, 2008. The contents of both applications are incorporated herein by reference in their entirety.

FIELD OF THE INVENTION

This invention relates to methods for making sheets of composite materials, including composite laminate materials.

BACKGROUND

Sheets of composite materials that contain fibers in a thermoplastic resin matrix are useful as plies in the manufacture of composite laminate panels. The fibers are disposed in a polymeric matrix material to form a composite sheet. Various methods are known in the art by which the fibers in a sheet of composite material may be disposed in, and encapsulated by, the polymeric matrix material, including, for example, a doctor blade process, lamination, pultrusion, extrusion, etc. The fibers may be longitudinally oriented (that is, they are aligned with each other), and continuous along the length of the ply. The fibers can also be chopped and longitudinally oriented relative to one another. A sheet of composite material may be characterized as "unidirectional" in reference to the generally uniform longitudinal orientation of the fibers therein.

The width of a composite material sheet has typically been limited based on such factors as difficulty in controlling fiber distribution, as well as the width of traditionally used processing machinery. In addition, composite laminates include multiple plies that when stacked on top of one another can cause the fibers in different plies to have different angular orientations relative to one another. Composite laminates are generally assembled in discrete processes, by stacking individual plies of composite material with fibers in cross-wise relation to each other, and bonding the stack into a single sheet.

SUMMARY OF THE INVENTION

The present invention resides in one aspect in an apparatus for producing a composite laminate. The apparatus includes a first unwind station that includes at least one roll support assembly for rotatably supporting a roll of composite material. A tacking station is located downstream of the first unwind station and defines a tacking surface. A heating station is positioned downstream of the tacking station for heating the composite material fed from the roll in response to the composite material moving past the heater. The apparatus also includes a processing station including at least one calender roll assembly positioned downstream of the heating station.

The invention resides in another aspect in a method for making a composite laminate by positioning a plurality of lengths of composite material in adjacent relation to each other. The lengths of composite material are tacked together and the lengths of composite material are heated. The heated lengths of composite material are passed through a calender roll assembly to yield a composite laminate; and the composite laminate is collected.

BRIEF DESCRIPTION OF THE DRAWINGS

FIG. 3 is a perspective view of a tacking station with an optional second ply station in the apparatus of FIG. 1;

FIG. 5C is an exploded perspective view of a roll oven for the heated calender roll assembly of the of one or more processing modules of FIG. 5BA;

DETAILED DESCRIPTION OF THE INVENTION

Figure 1:
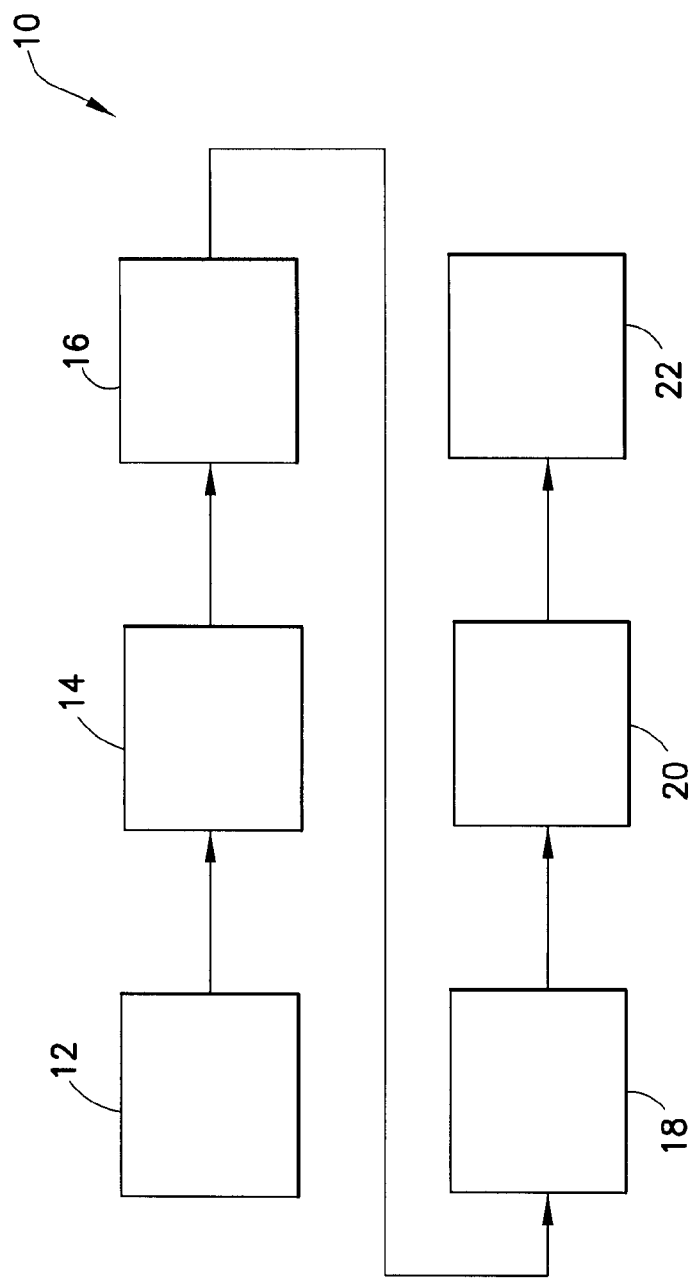
FIG. 1 is a schematic view of an apparatus for practicing the method of manufacture as described herein according to one embodiment of the present invention.

One embodiment of an apparatus for producing composite material, indicated generally at 10 in FIG. 1, includes an unwind station 12 where composite material can be fed or unwound from rolls of composite material for further processing by the apparatus 10. There is a tacking station 14 adjacent to the unwind station, where additional layers of composite material can be tacked onto the composite material being unwound from the unwind station 12. These additional layers can be configured so that the fibers forming part of the additional layers of composite material can be oriented at different angles relative to the fibers in the composite material being unwound from the unwind station 12. However, the invention is not limited in this regard, as the fibers forming part of the additional layers can also be oriented substantially parallel to the fibers forming part of the composite being unwound from the unwind station 12. The apparatus 10 includes an optional second unwind station 16 adjacent to the tacking station, where at least one additional layer of composite material can be unwound from rolls of composite material thereon. These layers can be unwound on top of the composite material unwound from the first unwind station 12 and any additional layers added at the tacking station 14. There is a heating station 18 downstream from the tacking station 14, where layers of composite material are heated so that they can bond to one another. There is also a processing station 20 downstream from the heating station 18. The processing station 20 includes at least one calender roll assembly, as explained in greater detail below. An uptake station 22 is positioned downstream of the processing station 20 for winding composite material laminate thereon. The overall progress of composite material from the unwind station 12 to the uptake station 22 is referred to herein as "the process direction," indicated by the arrows in FIG. 1. The terms "upstream" and "downstream" are sometimes used herein to refer to directions or positions relative to the process direction ("downstream" referring to a direction consonant with the process direction).

Figure 2A:
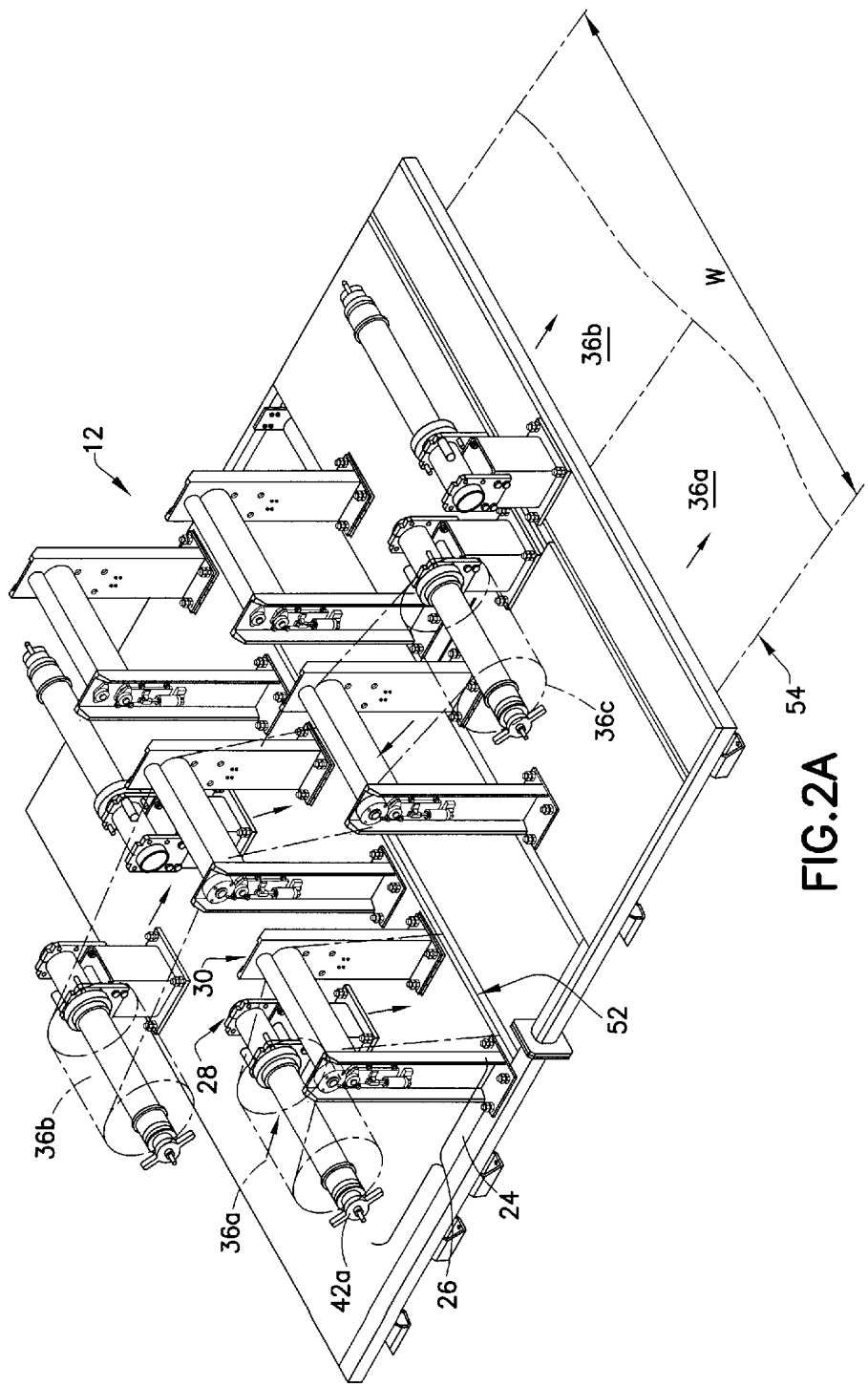
FIG. 2A is a perspective view of one embodiment of an unwind station of the apparatus of FIG. 1.
Figure 2B:
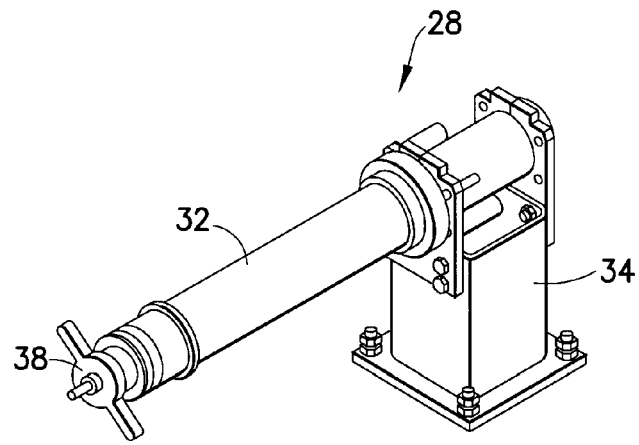
FIG. 2B is a perspective view of a support roller assembly of the unwind station of FIG. 2A.
Figure 2C:
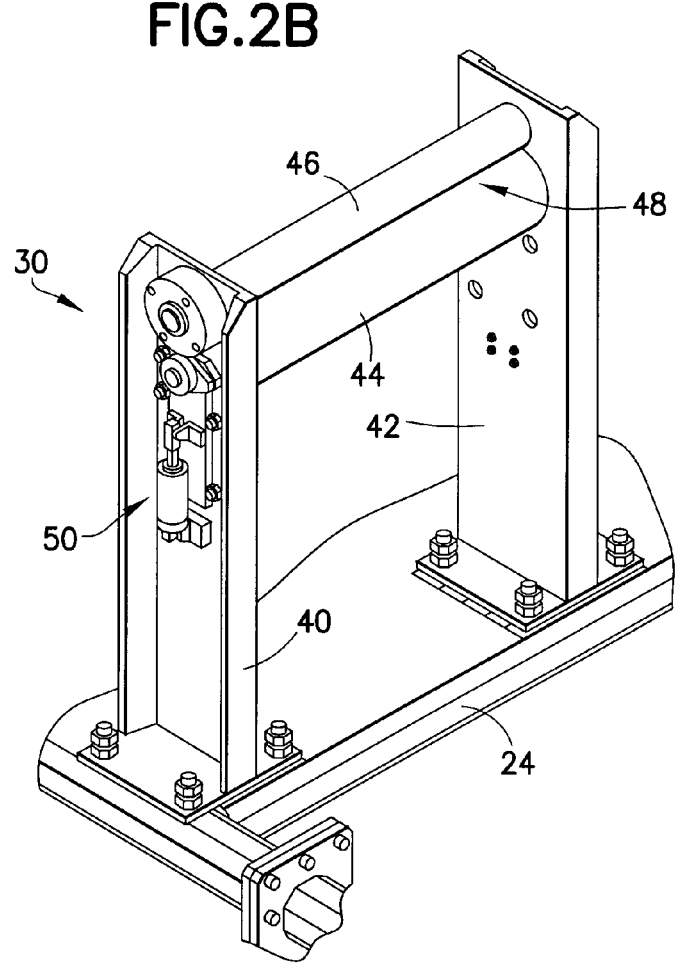
FIG. 2C is a perspective view of a material guide assembly of the unwind station of FIG. 2A
Figure 3A:
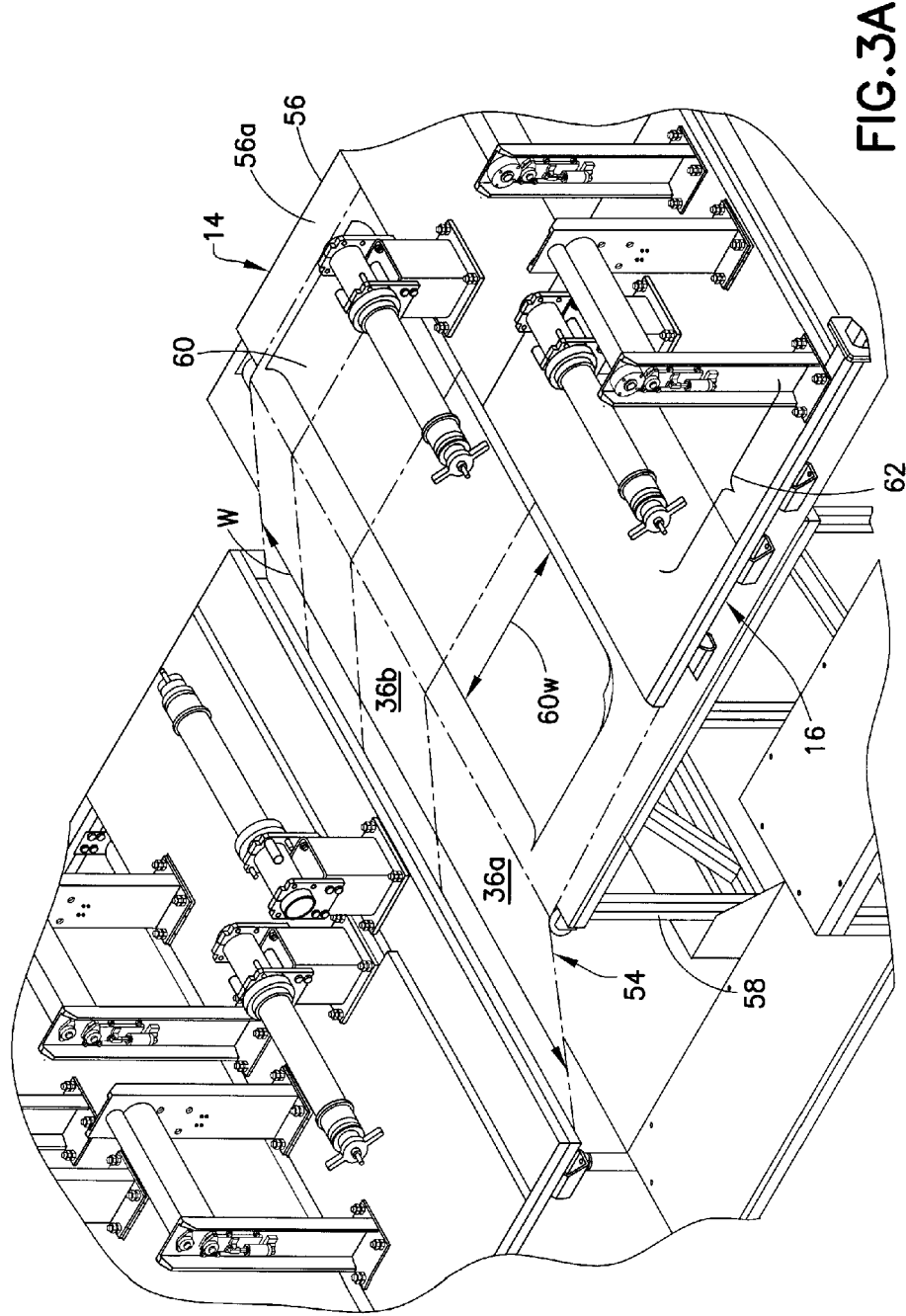
FIG. 3A is a perspective view of the tacking station of FIG. 3 with first ply composite materials and a cross-ply composite material for tacking thereon.

As shown in FIG. 2A, the unwind station 12 includes an unwind frame 24 on which are mounted five similarly configured roll support assemblies, one of which is indicated at 26. While the unwind station 12 has five roll support assemblies 26, the present invention is not limited in this regard as fewer than, or more than, five roll support assemblies can form part of the unwind station without departing from the broader aspects of the present invention. The roll support assembly 26, like the other roll support assemblies shown in FIG. 2A, includes a support roller assembly 28 (also seen in FIG. 2B) and an associated material guide assembly 30 (also seen in FIG. 2C). The support roller assembly 28 comprises a support roller 32 rotatably coupled to a pedestal 34, the pedestal being mounted to the unwind frame 24. Each support roller 32 is configured to carry a roll of composite material thereon, as indicated by the rolls of composite material 36a, 36b, 36c in FIG. 2A. A locking cap 38 is removably mounted to the support roller 32 to removably retain a roll of composite material thereon. The locking cap 38 can be threaded onto the support roller 32, however, the present invention is not limited in this regard as the locking cap can be retained on the support roller in other manners known to those skilled in the pertinent art to which the present invention pertains. For example, the locking cap 38 could be bolted onto the support roller 32 or retained thereon via a snap ring. The support roller assembly 28 may include a support roller drive mechanism (not shown) or a support roller braking mechanism (not shown) to accelerate or retard the unwinding of the roll of composite material 36a on the support roller 32 to vary or adjust the amount of tension in the composite material as it is unwound from the roll.

Each material guide assembly 30 includes a pair of upstanding roller mounts 40, 42 that are secured to the unwind frame 24. Each material guide assembly 30 further includes a first roller 44 interposed between, and rotatably coupled to, the upstanding roller mounts 40, 42, and a second roller 46 interposed between and also rotatably coupled to the upstanding roller mounts. The first roller 44 and the second roller 46 cooperate to define a nip indicated at 48 between them through which composite material being fed from the associated support roller assembly 28 passes. The first roller 44 may be vertically slidable relative to the upstanding roller mounts 40, 42 by an adjustment mechanism 50 that serves to vary and/or adjust the pressure on composite material 36a in the nip and/or the tension in the composite material 36a, etc. and/or the rate at which the composite material is drawn from the associated support roll assembly 28. The adjustment mechanism 50 can take the form of a pneumatic or hydraulic cylinder, a ball screw, a stepper motor or other mechanical actuator. However, the present invention is not limited in this regard as numerous other adjustment mechanisms that would be known to one of ordinary skill in the art to which the invention pertains may be employed. The material guide assembly 30 serves to orient and direct the composite material 36a, etc. being drawn from the associated support roller assembly 28.

Each material guide assembly 30 may comprise a brake mechanism (not shown) and/or a drive mechanism (not shown). The brake mechanism would impart resistance to the rotation of the first roller 44, so that a desired tension can be maintained in the composite material 36a as it is pulled through the nip indicated at 48. On the other hand, a material guide drive mechanism may drive the first roller 44 to facilitate passage of the composite material 36a through the nip indicated at 48. In this way, the adjustment mechanism 50 may alleviate resistance to the advancement of the composite material 36a through the nip indicated at 48. Since the rotational inertia of a roll of composite material 36a on a support roller 32 varies as material is drawn from the roll, the adjustment mechanism 50 may be adjusted during operation of the apparatus 10 to maintain an appropriate tension in the composite material 36a.

The five roll support assemblies 26 are positioned on the unwind frame 24 so that when lengths of composite material 36a, etc. are drawn from each roll, the lengths will pass through a web aperture 52 in the unwind frame 24 and emerge from beneath the unwind frame 24 in side-by-side arrangement to define a web 54 (FIG. 2A, FIG. 4) that spans a width W defined by the number of rolls of composite material, the width W being wider than any one of the rolls of composite material. As will be explained in detail below, the web 54 provides at least a lengthwise first layer for a composite laminate 200.

The tacking station 14 is located downstream from the unwind station 12 and includes a tacking platform 56 mounted on a tacking frame 58. The tacking frame 58 in the illustrated embodiment defines a width that is approximately equivalent to the width of the unwind frame 24. The tacking platform 56 defines a substantially planar tacking surface 56a on which adjacent lengths of composite material 36a, 36b, etc. are disposed and tacked together to form a first layer of the composite material 200, e.g., by disposing a second layer of composite material onto the first layer of composite material 36a, 36b, etc. Depending on the type of composite material 36a, etc. and the fiber orientation therein, the second layer of composite material can be tacked either lengthwise or in a cross ply or other configuration.

In one embodiment, the composite material 36a, 36b, etc. is tacked together by laying a cross ply 60 of composite material onto the composite material 36a, 36b, etc. The cross ply 60 overlaps at least two adjacent composite materials 36a, 36b and preferably extends across the entire width W of the web 54. The cross ply 60 is tacked onto the composite material 36a, 36b, etc. to form a web 54. Tacking may be accomplished using heat guns, ultrasonic welding tools, adhesives, or the like, while the web 54 is moving through the apparatus 10. Tacking is a relatively quick and easy way of securing adjacent and/or layered sheets of composite material in the desired position for being bonded together.

The cross ply 60 may be a unidirectional sheet, i.e., the fibers therein may be mutually aligned. In a particular embodiment, the fibers in the cross ply 60 are disposed in transverse relation to the fibers in the composite material 36a in which case the cross ply 60 may be referred to as a cross-ply sheet and the resulting composite laminate 200 is referred to as a cross-ply laminate. The cross ply sheet may be disposed at any angle relative to the fibers in the composite material 36a, 36b, etc.

A cross ply 60 has a limited width 60w in the process direction. In one embodiment, a plurality of cross plies 60 are disposed in adjacent relation to each other on the layers of the composite material 36a, 36b, etc., to provide a consistent second ply for composite laminate 200.

In one embodiment, an industrial robot may be employed to place cross plies 60 on the composite material 36a, 36b, etc. and, optionally, to tack the cross plies 60 thereon. Such a robot may be provided with a supply of cross ply material, e.g., in roll form or as a stack of pre-cut sheets. The robot may be equipped to place the cross ply material onto the web 54, e.g., by drawing a length of the cross ply material from the supply roll and cutting the cross ply material to the desired length, or by handling a pre-cut sheet. The robot may be equipped with a tacking arm that includes a heat gun, sonic welding horn, or any other suitable tacking device, and that may tack the cross ply material to the web 54 and tack the composite material 36a, 36b, etc. together. The robot may be configured to draw or place the cross ply material orthogonally across the web 54 or at any other desired angle.

The optional second unwind station 16 is positioned downstream from, and above, the tacking station 14 and includes roll support assemblies 62 where additional rolls of composite material may be disposed. The second unwind station 16 has generally the same configuration as the first unwind station 12 to enable the second unwind station 16 to provide a web of composite material that spans a width approximately equal to width W, i.e., the second unwind station 16 has roll support assemblies 62 positioned to correspond to the positions of the roll support assemblies 26 etc. of the first unwind station 12. The second unwind station 16 is configured to permit the web 54 to pass beneath it and to allow an additional lengthwise layer of composite material from the second unwind station 16 to be added onto the web 54. In this way, the second unwind station 16 facilitates providing a second lengthwise layer of composite material for the composite laminate 200. While a second unwind station 16 has been shown and described for the apparatus 10, the present invention is not limited in this regard, and in other embodiments, an apparatus for making composite laminate may not have a second unwind station. In still other embodiments, an apparatus for making composite laminate may include more than two unwind stations, to enable the apparatus to produce a composite laminate having more than two lengthwise layers of composite material.

Figure 4:
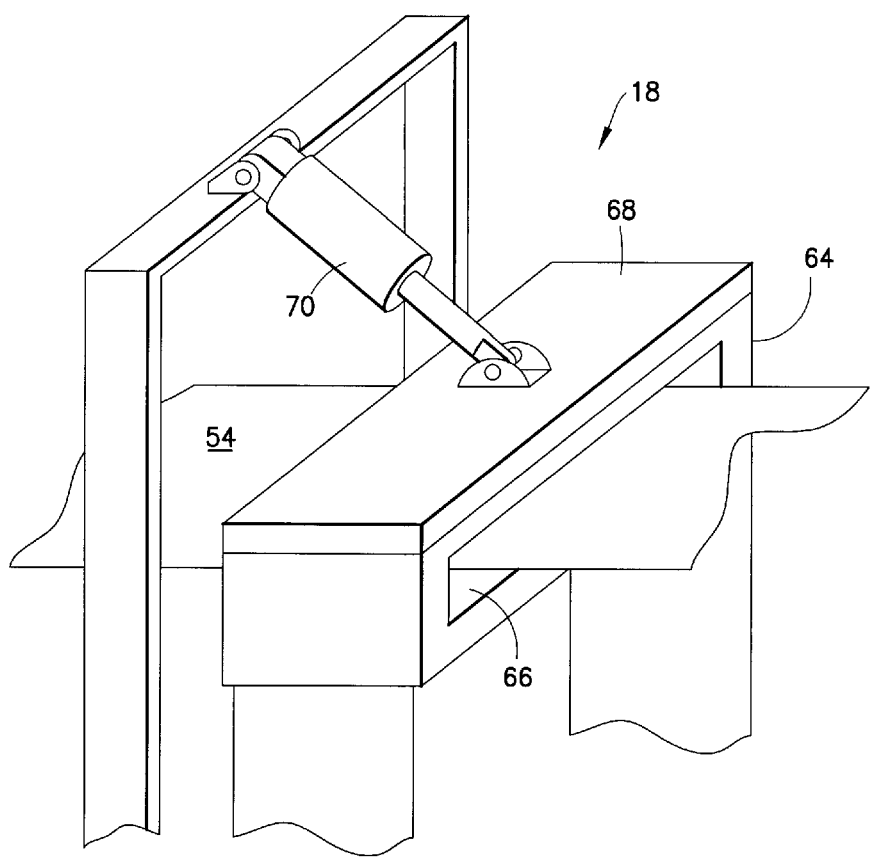
FIG. 4 is a schematic perspective view of an oven station in the apparatus of FIG. 1.

As shown in FIG. 4, one embodiment of a heating station 18 includes an oven 64 that has an entrance (not shown) that is adapted to receive the web 54 of composite material, and an exit 66 to allow the web 54 to move through the oven. The oven 64, which may include a convection oven and/or any other suitable heating element such as an electric radiant heating element, an infrared heating element, electric heaters, hot oil heaters, air impingement heaters, combinations thereof, and the like for heating the web. The oven 64 has a cover 68 that is movable between a raised position and a lowered position via an actuator 70 such as, but not limited to, a hydraulic or pneumatic cylinder, a lead screw, a motor and the like.

Figure 5A:
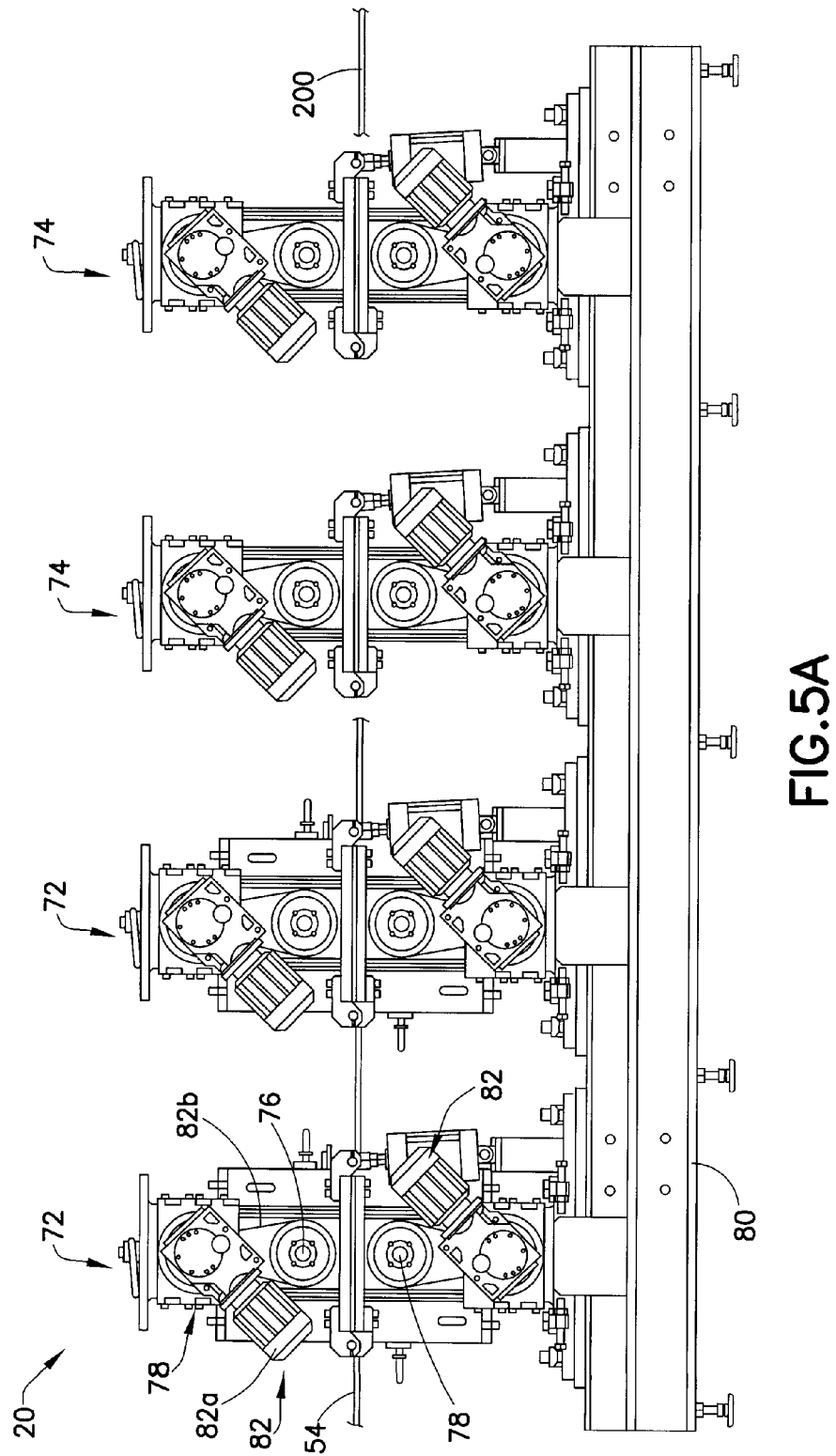
FIG. 5A is an elevation view of one or more processing modules of the apparatus of FIG. 1.

The processing station 20 is located downstream from the heating station 18. In one embodiment, as seen in FIG. 5A, the processing station 20 comprises calendar roll assemblies 72 and 74. Each calender roll assembly 72, 74 includes a frame 80 which supports two calender rolls 76 and 78. A drive mechanism 82 for each roll includes a drive motor 82a that is coupled to the calender roll 76 or 78 via a drive belt 82b. While a belt drive has been shown and described, the present invention is not limited in this regard as other types of drives, such as a direct drive, or motor and gear reducer combination can be utilized. One or both of the calender rolls 76 and 78 in a calender roll assembly 72, 74 may be equipped with a rotary union that permits the flow of a thermal transfer fluid (e.g., oil or water) through the roll, to heat or cool the roll during use, as desired.

Figure 5B:
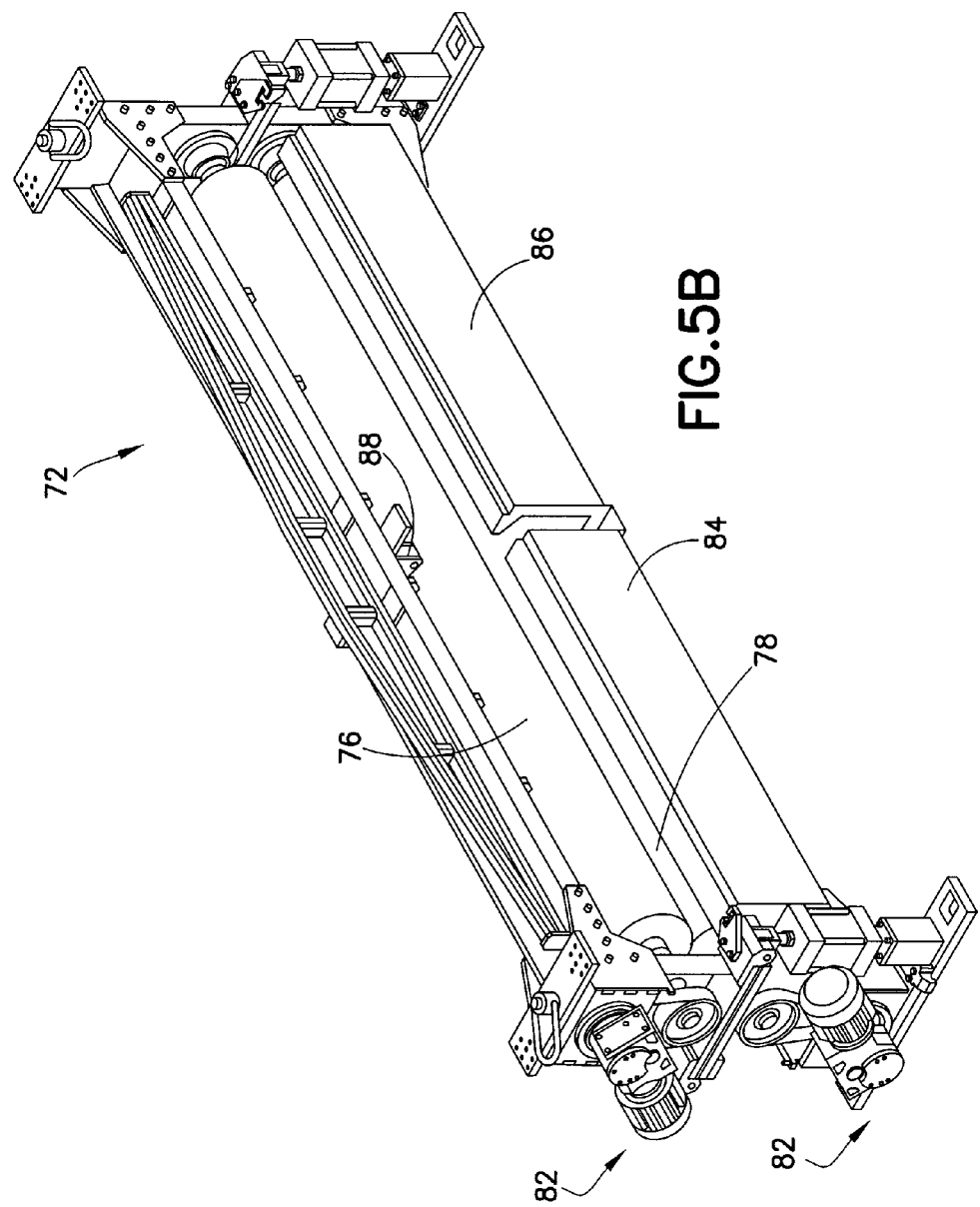
FIG. 5B is a perspective view of a heated calender roll assembly of the one or more processing modules of FIG. 5A.

As best seen in FIG. 5B, a heated calender roll assembly 72 comprises calender rolls 76 and 78 which cooperate to define a nip therebetween, and two roll ovens, 84 and 86, for the heating calender roll 78. Roll oven 84 heats a portion of the calender roll 78 and the second roll oven 86 is provided so that the calender roll is heated over its entire length, however, the invention is not limited in this regard, and in other embodiments, a single roll oven may heat the entire length of a calender roll, or only a selected portion of a calender roll may be heated. The calender roll assembly 72 includes a support follower 88 mounted and supported on calender roll assembly 72 so that it bears centrally on calender roll 76. Likewise, a support follower (not shown) is mounted to bear centrally on calender roll 78. The support followers 88 inhibit the calendar rollers from bowing away from each other in a central region. As seen in FIG. 5C, the roll oven 86 comprises an electric radiant heating element 90 that is configured to conform to the curvature of the calender roll 78. The roll oven 84 (FIG. 5B) is configured similarly to the roll oven 86. Alternatively, or in addition, one or both of the calender rolls 76 and 78 may be hollow and may define a flow path for the ingress and egress of a thermal transfer fluid therethrough, the thermal transfer fluid being supplied and withdrawn to and from a fluid supply. The roll 76 and/or the roll 78 may be equipped with a rotary union coupled to the roll through which hot thermal transfer fluid is flowed through the roll to provide heat.

Figure 5D:
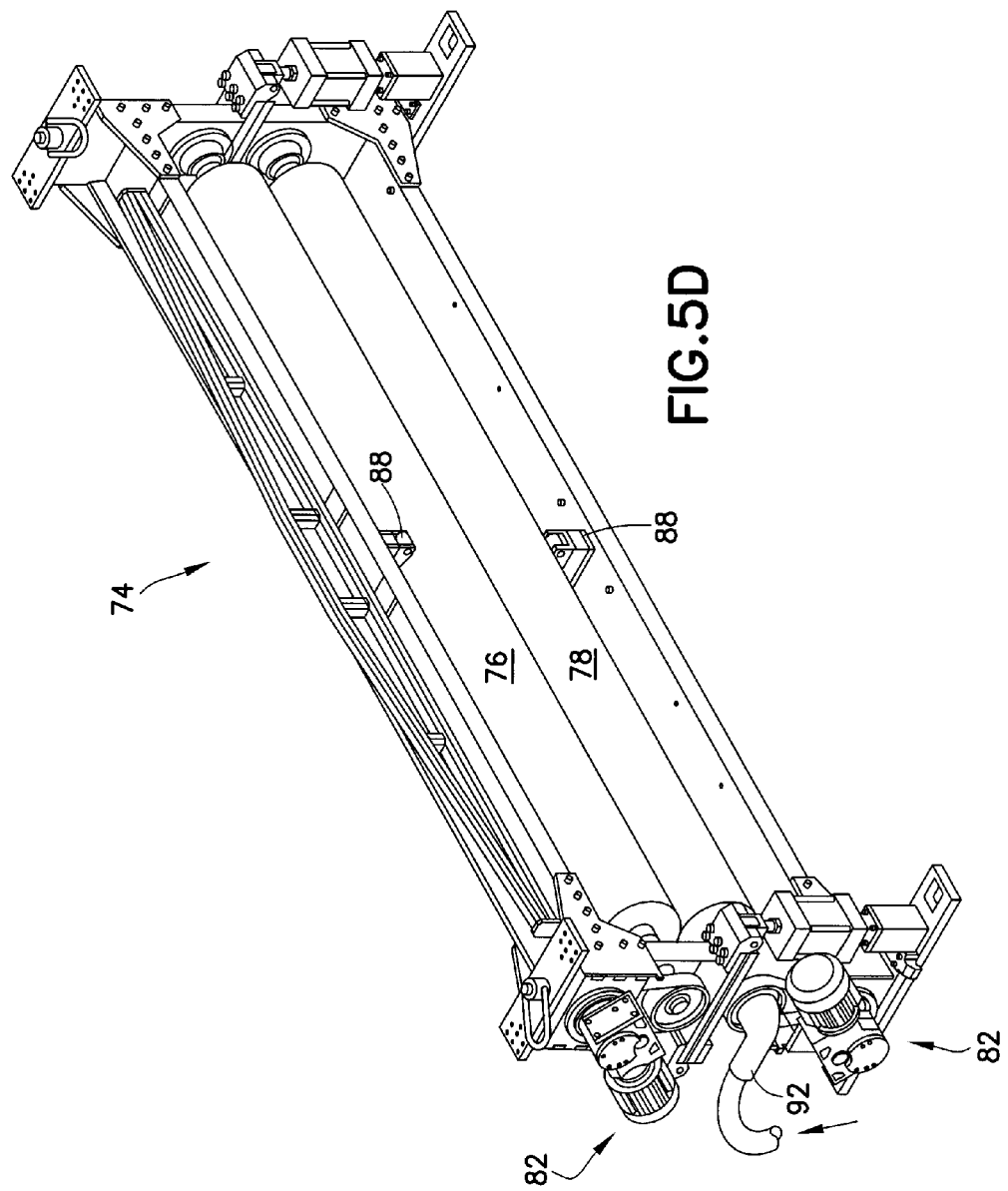
FIG. 5D is a perspective view of a cooled calender roll assembly of the of one or more processing modules of FIG. 5A.

FIG. 5D provides a perspective view of an unheated calender roll assembly 74, which is configured similarly to calender roll assembly 72, except for the omission of the roll ovens 84 and 86. In the absence of roll oven 84 and roll oven 86, it can be seen that the calender roll assembly 74 includes two support followers 88 to bear centrally on the calender rolls 76, 78, as in calender roll assembly 72. The calender roll 78 is hollow and defines a flow path for the ingress and egress of a thermal transfer fluid therethrough, the thermal transfer fluid being supplied and withdrawn to and from a fluid supply. In the illustrated embodiment, the roll 78 is equipped with a rotary union 92 coupled to the roll and through which a thermal transfer fluid is flowed through the roll to draw heat from the web 54 in contact therewith. If necessary, the rotary union 92 can be used to provide a heating fluid to heat the calender roll 78.

The processing station 20 is shown in FIG. 5A as having four calender roll assemblies 72 and 74, however, the invention is not limited in this regard, and in other embodiments a processing station 20 may include more than four or fewer than four calender roll assemblies, and may or may not have a cooling calender roll assembly and/or a heated calender roll assembly. For example, in one embodiment, rather than providing a cooled calender roll assembly, it may be sufficient to cool the web 54 by using a fan to blow cool air onto the web before the web passes to the uptake station 22, and/or by providing one or more unheated calender roll assemblies following the heated calender roll assembly 72, with the unheated calender roll assembly being spaced from the heated calender roll assembly 72 by a distance sufficient to allow heat to dissipate from the web 54 into the ambient air.

Figure 6:
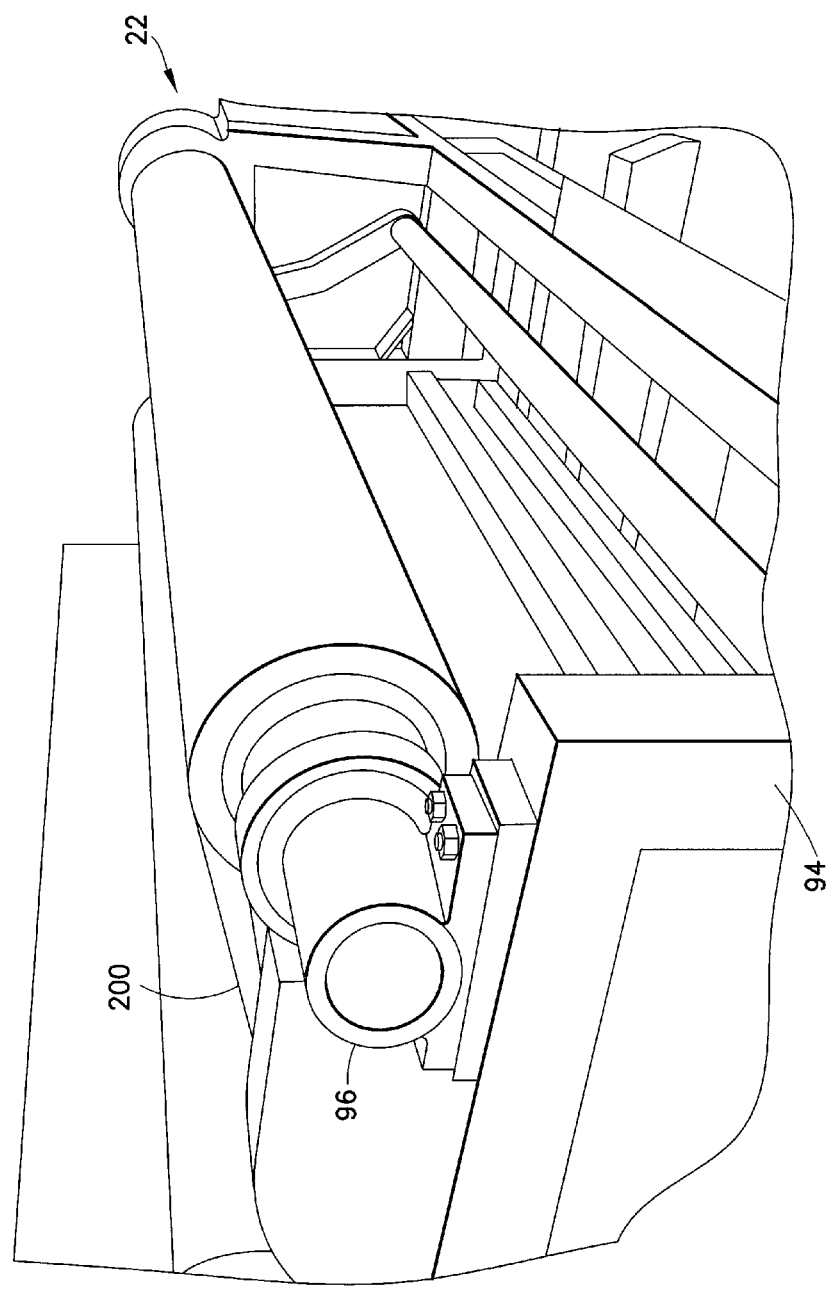
FIG. 6 is a perspective view of the uptake station of the apparatus of FIG. 1.

As shown in FIG. 6, the uptake station 22 comprises an uptake roll 96 positioned on an uptake frame 94. The uptake station 22 includes a motorized drive (not shown) for the uptake roll 96, to maintain an appropriate tension in the web 54. The motorized drive for the uptake roll 96 allows the uptake roll to collect the composite laminate 200 finished product from the processing station 20.

The various parts of the above-described apparatus 10 can be re-arranged as desired from the layout shown in FIG. 1, for example, to change the sequence in which material moving through the apparatus 10 in the process direction encounters the various stations, to omit stations that are not needed for a particular process, or to add additional stations between the unwind station 12 and the uptake station 22. In addition, the components of the various stations are movable and can be re-arranged within their respective stations. For example, one or more roll support assemblies 26 may be added to, or removed from, the unwind station 12, as desired. In addition, the roll support assemblies 26 may be re-arranged on the unwind frame 24 to provide varying degrees of overlap from adjacent composite material 36a, 36b, etc., in the web 54 and/or to provide a web 54 of various desired widths. Likewise, the calender roll assemblies 72, 74 of the processing station 20 are movable on, and removable from, the calender roll frame 80. Accordingly, the number, type, sequence and/or spacing of calender roll assemblies in the processing station 20 can be changed to accommodate the characteristics desired in the composite laminate 200 end product. For one product or process, a single calender roll assembly 72 or 74 might be sufficient; for another, three or four calender roll assemblies (or more) may be employed. In addition, the calender roll assemblies 72, 74 may be rearranged to provide any desired sequence of heated calender roll assemblies and cooling calender roll assemblies: heat, then cool; cool, heat, then cool; heat, cool, heat again; heat, cool, heat again, then cool; etc. Such flexibility in the apparatus allows for flexibility in the process employed to make various products.

The apparatus 10 may include a process controller (not shown) that communicates with the principal control mechanisms of the apparatus. In this way, the process controller provides a centralized point where an operator can control one or more aspects of the operation of the apparatus, such as the speed of the web 54 through the apparatus, the tension in the web, the pressure applied at various nips, the temperature of the heating station 18, the amount of heat supplied by heated calender roll assemblies 72, the operation of the industrial robot for applying the cross ply and/or tacking the web 54, etc.

Figure 7:
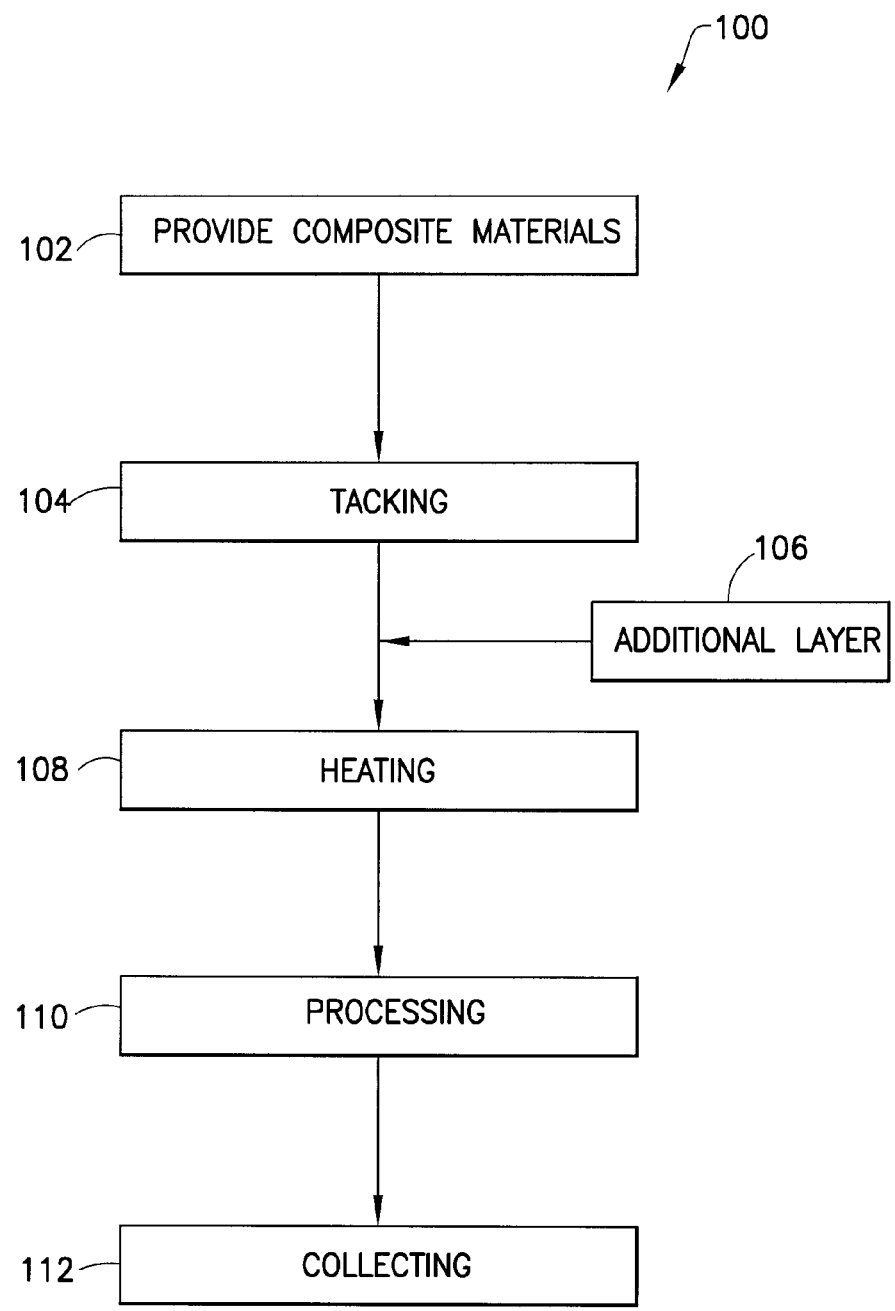
FIG. 7 is a flowchart of a method according to one embodiment.

In one embodiment, the apparatus 10 can be used to carry out a method indicated generally at 100 in FIG. 7 for making a composite laminate 200. The method 100 begins with a first step 102 of providing lengths of composite material, e.g., from rolls of composite material 36a, 36b, etc., mounted on the roll support assemblies 26 of the unwind station 12. The lengths of composite material 36a etc. are drawn and arranged into a web 54 that extends to the tacking station 14. In a tacking step 104, the composite material 36a etc. is tacked together at the tacking station 14 to form the web 54, for example, with the use of the cross ply 60.

In an optional layering step 106, additional lengths of composite material may be added to the web 54. For example, additional rolls composite material may be disposed on the second unwind station 16 and the additional composite material may be unwound from the second unwind station 16 and applied onto the first ply composite material 36a, etc. and onto the cross ply 60. In this case, the method 100 can yield a composite laminate 200 (FIG. 6) which includes two continuous plies (one each from unwind stations 12 and 16) with a cross-ply 60 between them.

After the tacking step 104, and after optionally applying additional layers of composite material on the web 54 in step 106, the web 54 is subjected to a heating step 108 to help the lengths of composite material 36a etc. and any cross ply 60 thereon to bond together. For this purpose, the web 54 passes to the heating station 18, where the adjacent first ply composite material 36a etc. are heated to soften the polymeric material therein so that the various sheets can be bonded to one another. After the heating step 108, the web 54 is subjected to a processing step 110 in which the lengths of composite material 36a etc. are formed into a composite laminate 200 that can be collected. For example, in one processing step 110, the web 54 passes to the processing station 20, where the material is subjected to pressure and, optionally, heating and/or cooling in one or more calender roll assemblies 72 and/or 74. The heat and/or pressure of the calender roll assemblies 72 and/or 74 causes the adjacent composite material 36a, 36b, etc. (and any other composite materials thereon) to bond together. When adjacent composite material 36a, 36b, etc. comprise thermoplastic matrix materials, the heat and/or pressure of the calender roll assemblies 72 and/or 74 may be sufficient to cause the matrix materials. However, if one or both of the adjacent composite materials comprise thermosetting matrix materials, it may be desirable to provide adhesive or other additional means as are known to one of ordinary skill in the art, to bond the composite materials together. The web 54 is cooled as part of the processing step 110, and in a collection step 112, the composite laminate 200 product is collected at the uptake station 22 onto an uptake roll 96. The cooling that occurs in the processing step 110 permits the web 54 to collected, e.g., wound on a roll, as the composite laminate 200 without bonding adjacent windings of the composite laminate onto each other.

In the embodiment of FIGS. 1 and 5A-5D, the web 54 advances in the process direction through the heated calender roll assemblies 72 and then through the cooling calender roll assemblies 74. The heated calender roll assemblies 72 heat the composite materials so that adjacent composite materials bond together. Both calender roll assemblies 72 and 74 also compress the composite materials together to enhance the bonding process. The cooling calender roll assemblies 74 then remove heat from the web 54 so that adjacent layers of the composite laminate 200 will not merge into each other at ambient temperatures. In this way, storage and handling of the composite laminate 200 is facilitated. For example, the composite laminate 200 may be collected onto an uptake roll 96 at the uptake station 22 without bonding adjacent windings onto each other.

By providing rolls of composite material 36a etc. of sufficient length so that product sheet can be wound onto an uptake roll 96 as composite material 200 is still being unwound from the unwind station 12, the process and apparatus described herein can be described as a "continuous" process.

Various types of fibers may be used in a composite material. Example fibers include E-glass and S-glass fibers. E-glass is a low alkali borosilicate glass with good electrical and mechanical properties and good chemical resistance. This type of glass is the most widely used in fibers for reinforcing plastics. Its high resistivity makes E-glass suitable for electrical composite laminates. The designation "E" is for electrical.

S-glass is the higher strength and higher cost material relative to E-glass. S-glass is a magnesia-alumina-silicate glass for aerospace applications with high tensile strength. Originally, "S" stood for high strength. Both E-glass and S-glass are preferred fibers in this invention.

E-glass fiber may be incorporated in the composite in a wide range of fiber weights and thermoplastic polymer matrix material. The E-glass may range from about 10 to about 40 ounces per square yard (oz./sq.yd.), more preferably 19 to 30 and most preferably 21.4 to 28.4 oz./sq.yd. of reinforcement.

The quantity of S-glass or E-glass fiber in a composite material ply may optionally accommodate about 40 to about 90 weight percent (wt %) thermoplastic matrix, more preferably about 50 to about 85 wt % and most preferably, about 60 to about 80 wt % thermoplastic matrix in the ply, based on the combined weight of thermoplastic matrix plus fiber.

Other fibers may also be incorporated, preferably in combination with E-glass and/or S-glass, but optionally instead of E- and/or S-glass. Such other fibers include ECR, A and C glass, as well as other glass fibers; fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

A preferred organic polymer fiber is formed from an aramid exemplified by Kevlar. Other preferred high performance, unidirectional fiber bundles generally have a tensile strength greater than 7 grams per denier. These bundled high-performance fibers may be more preferably any one of, or a combination of, aramid, extended chain ultra-high molecular weight polyethylene (UHMWPE), poly [p-phenylene-2,6-benzobisoxazole] (PBO), and poly[diimidazo pyridinylene (dihydroxy) phenylene] (M5). The use of these very high tensile strength materials is particularly useful for making composite ballistic armor panels and similar applications requiring very high ballistic properties.

Still other fiber types known to those skilled in the particular art to which the present invention pertains can be substituted without departing from the broader aspects of the present invention. For example, Aramid fibers such as, inter alia, those marketed under the trade names Twaron, and Technora; basalt, carbon fibers such as those marketed under the trade names Toray, Fortafil and Zoltek; Liquid Crystal Polymer (LCP), such as, but not limited to LCP marketed under the trade name Vectran. Based on the foregoing, the present invention contemplates the use of organic, inorganic and metallic fibers either alone or in combination.

The composite plies of the present invention may optionally include fibers that are continuous, chopped, random, commingled and/or woven. In particular embodiments, composite plies as described herein may contain longitudinally oriented fibers to the substantial exclusion of non-longitudinally oriented fibers.

The polymeric matrix material may comprise a thermosetting polymer and/or a thermoplastic polymer. A thermoplastic polymer resin material that may be a high molecular weight thermoplastic polymer, including but not limited to, polypropylene, polyethylene, nylon, PEI (polyetherimide) and copolymers, more preferably, polypropylene and polyethylene. Thermoplastic loading by weight can vary widely depending on physical property requirements of the intended use of the product sheet.

A composite material may contain about 60 to about 10 wt % thermoplastic matrix, more preferably about 50 to about 15 wt % and most preferably, about 40 to about 20 wt % of thermoplastic matrix material, by weight of thermoplastic matrix material plus fibers.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. An apparatus for producing a composite laminate, said apparatus comprising:
    a first unwind station including at least a first roll support assembly and a second roll support assembly, each roll support assembly configured to rotatably support a roll of composite material, wherein said first unwind station is configured such that when a first length of composite material is drawn from said first roll support assembly and a second length of composite material is drawn from said second roll support assembly the first and second lengths of composite material emerge from said first unwind station in a side-by-side arrangement defining a web having a width greater than one of a width of said first length of composite material and a width of said second length of composite material;
    a heating station located downstream of said first unwind station, the heating station being adapted to receive and heat said web, the heating station comprising an entrance adapted to receive said web, an exit adapted to allow said web to exit said heater; a cover movable between an opened position and a closed position; and a heat source for heating said web as it moves between said entrance and said exit; and
    a processing station positioned downstream of said heating station, said processing station adapted to receive said web, wherein said processing station comprises at least one calender roll assembly, the calender roll assembly includes a pair of rollers rotatably mounted to a support frame, said rollers defining a nip therebetween so that during operation, said web is fed into said nip such that said rollers exert pressure on said web, where at least one of said rollers is heated.

2. An apparatus as defined by claim 1 comprising a roller that is cooled.

3. An apparatus as defined by claim 1, wherein at least one of the pair of rollers is movable relative to the other of the pair of rollers between a retracted and engaged position; and
    wherein said apparatus further includes means for moving at least one of said pair of rollers relative to the other of said pair of rollers between said retracted and engaged positions in response to commands issued from a controller.

4. An apparatus as defined by claim 1 wherein said at least one calender roll assembly includes a first drive means for rotating at least one of said pair of rollers in response to commands issued from a controller.

5. An apparatus as defined by claim 1 further comprising:
    at least one roll cover positioned adjacent said at least one roller; and
    a roll heater coupled to said at least one roll cover for heating said at least one roller.

6. An apparatus as defined by claim 5 wherein said roll heater includes at least one electric heating element coupled to said cover and responsive to commands issued from a controller so that during operation of said at least one calender roll assembly, at least one roller of the calender roll assembly is heated.

7. An apparatus as defined by claim 1 wherein at least one of said rollers has a flow path therein for the ingress of a thermal transfer fluid therethrough; and a rotary union for supplying said thermal transfer fluid to said flow path.

8. An apparatus as defined by claim 1 wherein said heating station comprises heated air directed onto said web.

9. An apparatus as defined by claim 1, comprising a plurality of calender roll assemblies each comprising a pair of rollers rotatably mounted to a support frame, said pairs of rollers each defining a nip there between so that during operation, said web is fed into said nips such that said rollers exert pressure on said web.

10. An apparatus as defined by claim 9 including at least one heated calender roll assembly.

11. An apparatus as defined by claim 10 including at least one cooling calender roll assembly.

12. An apparatus as defined by claim 1 wherein said first unwind station includes an unwind frame, and wherein the apparatus includes a plurality of support roll assemblies mounted on said unwind frame.

13. An apparatus according to claim 1, further comprising an uptake station positioned downstream of the processing station.

14. An apparatus according to claim 1 wherein the web provides at least a lengthwise first layer for a composite laminate.

15. An apparatus according to claim 1, further comprising:

a tacking station downstream of said first unwind station, said tacking station defining a tacking surface, the tacking station adapted to receive the web, wherein the tacking station is configured to tack said web.

16. An apparatus as defined by claim 15 further comprising:

a second unwind station positioned between said tacking station and said heater, said second unwind station including at least one roll support assembly for rotatably supporting a roll of composite material.

17. An apparatus according to claim 1, wherein said first length of composite material comprises a polymeric matrix material and fiber.

18. An apparatus according to claim 17, wherein said fiber is selected from the group consisting of E-glass fiber, S-glass fiber, ECR, A glass fiber, C glass fiber, quartz fiber, magnesia alumuninosilicate fiber, non-alkaline aluminoborosilicate fiber, soda borosilicate fiber, soda silicate fiber, soda lime-aluminosilicate fiber, lead silicate fiber, non-alkaline lead boroalumina fiber, non-alkaline barium boroalumina fiber, non-alkaline zinc boroalumina fiber, non-alkaline iron aluminosilicate fiber, cadmium borate fiber, alumina fiber, asbestos fiber, boron fiber, silicone carbide fiber, graphite fiber, carbon fiber, mesophase pitch fiber, cellulose fiber, polyacrylonitrile fiber, ceramic fiber, metal fiber, and combinations thereof.

19. An apparatus according to claim 1, wherein said second length of composite material comprises a polymeric matrix material and fiber.

20. An apparatus according to claim 19, wherein said fiber is selected from the group consisting of E-glass fiber, S-glass fiber, ECR, A glass fiber, C glass fiber, quartz fiber, magnesia alumuninosilicate fiber, non-alkaline aluminoborosilicate fiber, soda borosilicate fiber, soda silicate fiber, soda lime-aluminosilicate fiber, lead silicate fiber, non-alkaline lead boroalumina fiber, non-alkaline barium boroalumina fiber, non-alkaline zinc boroalumina fiber, non-alkaline iron aluminosilicate fiber, cadmium borate fiber, alumina fiber, asbestos fiber, boron fiber, silicone carbide fiber, graphite fiber, carbon fiber, mesophase pitch fiber, cellulose fiber, polyacrylonitrile fiber, ceramic fiber, metal fiber, and combinations thereof.

* * * * *